(12) United States Patent
Byun et al.

(10) Patent No.: US 8,139,955 B2
(45) Date of Patent: *Mar. 20, 2012

(54) METHOD AND SYSTEM FOR CONTROLLING DRIVING CURRENT OF WDM-PON OPTICAL TRANSMITTER

(75) Inventors: Jae Oh Byun, Chungcheongnam-do (KR); Kyoung Min Kim, Seoul (KR)

(73) Assignee: Luxpert Technologies Co., Ltd. (KR)

( * ) Notice: Subject to any disclaimer, the term of this patent is extended or adjusted under 35 U.S.C. 154(b) by 404 days.

This patent is subject to a terminal disclaimer.

(21) Appl. No.: 12/516,930

(22) PCT Filed: Mar. 24, 2008

(86) PCT No.: PCT/KR2008/001651
§ 371 (c)(1),
(2), (4) Date: May 29, 2009

(87) PCT Pub. No.: WO2009/051312
PCT Pub. Date: Apr. 23, 2009

(65) Prior Publication Data
US 2010/0067907 A1    Mar. 18, 2010

(30) Foreign Application Priority Data
Oct. 17, 2007  (KR) .................. 10-2007-0104355

(51) Int. Cl.
H04B 10/04    (2006.01)

(52) U.S. Cl. ......... 398/196; 398/195; 398/192; 398/182

(58) Field of Classification Search .................. 398/196, 398/195, 192, 182
See application file for complete search history.

(56) References Cited

U.S. PATENT DOCUMENTS

| | | | |
|---|---|---|---|
| 2004/0101305 A1* | 5/2004 | Jung et al. | 398/71 |
| 2004/0208208 A1* | 10/2004 | Shin et al. | 372/32 |
| 2006/0140548 A1* | 6/2006 | Shin et al. | 385/89 |
| 2007/0081823 A1* | 4/2007 | Lee et al. | 398/79 |

FOREIGN PATENT DOCUMENTS

KR    20040044673    5/2004

OTHER PUBLICATIONS

International Search Report, PCT/KR2008/001651, dated Jun. 30, 2008.

* cited by examiner

*Primary Examiner* — Kinam Park
(74) *Attorney, Agent, or Firm* — Cantor Colburn LLP

(57) ABSTRACT

The present disclosure relates to a WDM-PON optical transmitter; and, more particularly, to a system for controlling a driving current of the WDM-PON optical transmitter. The present disclosure provides a driving current control system of an optical transmitter for use in WDM-PON including a plurality of optical transmitters, each transmitter generating and transmitting a transmittance optical signal based on a driving current and an optical multiplexer/demultiplexer for combining the optical signals received from the plurality of the optical transmitters to output a combined optical signal through a single common terminal, wherein the driving current is controlled based on the combined optical signal outputted from the common terminal.

8 Claims, 5 Drawing Sheets

[Fig. 1]
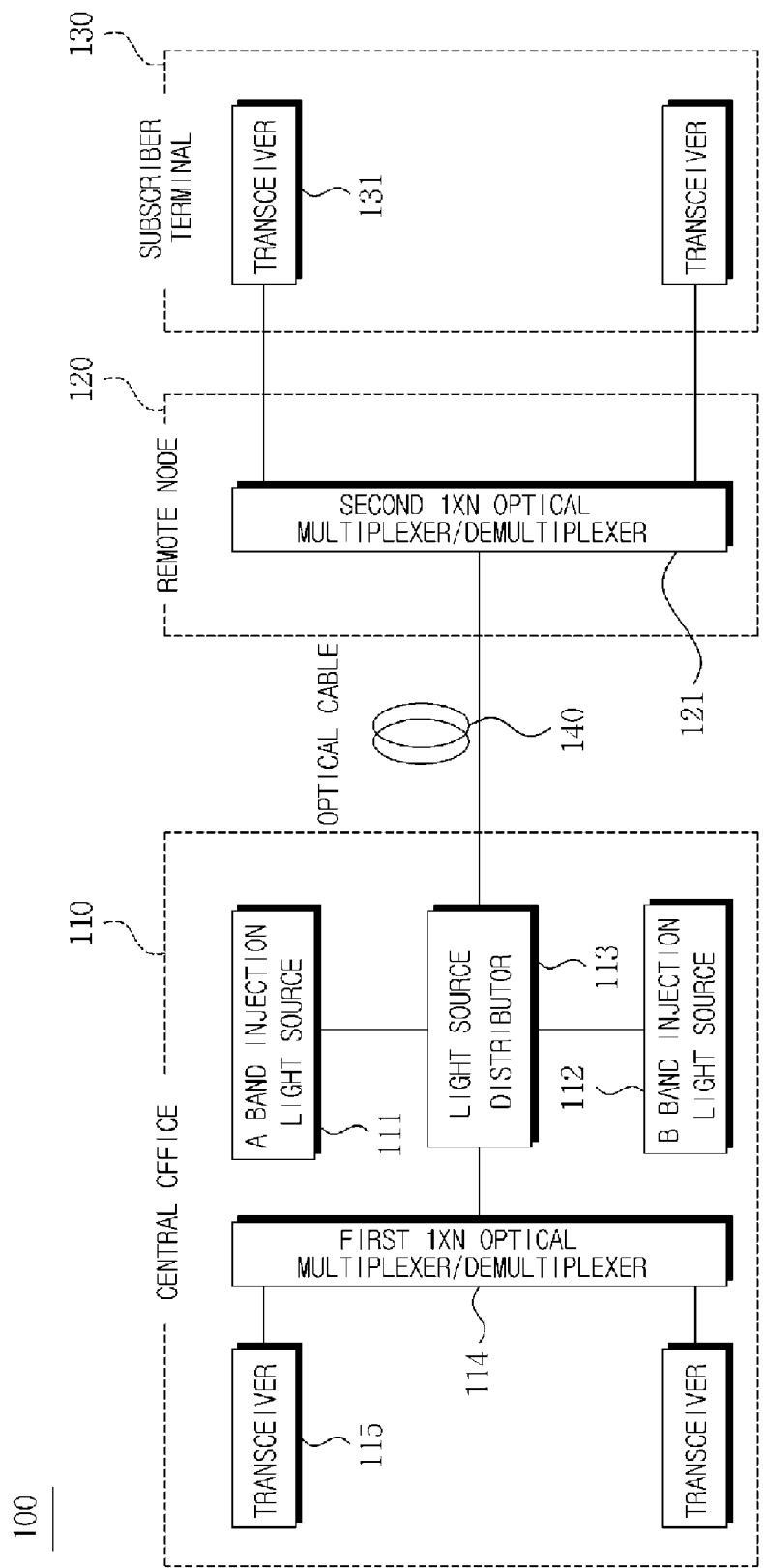

[Fig. 2]
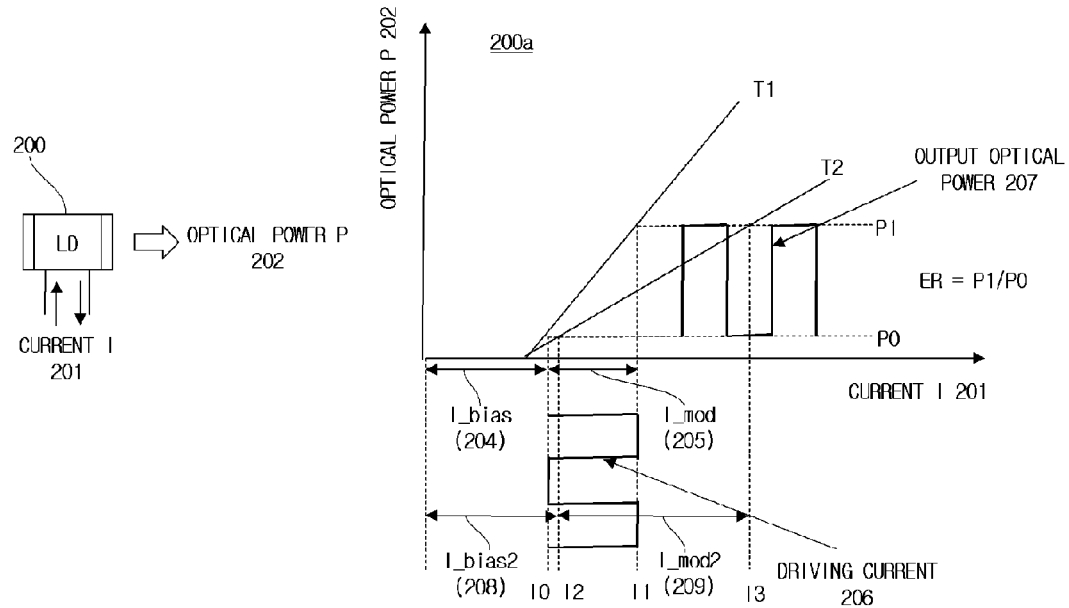
[Fig. 3]
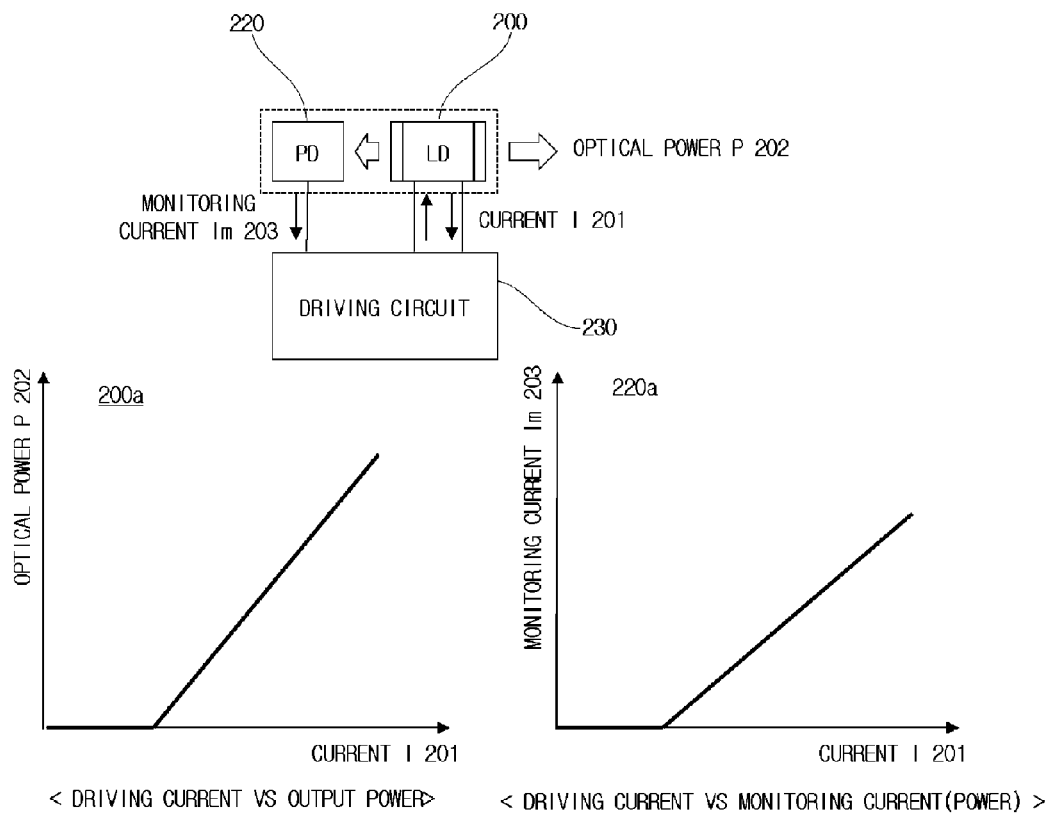

[Fig. 4]
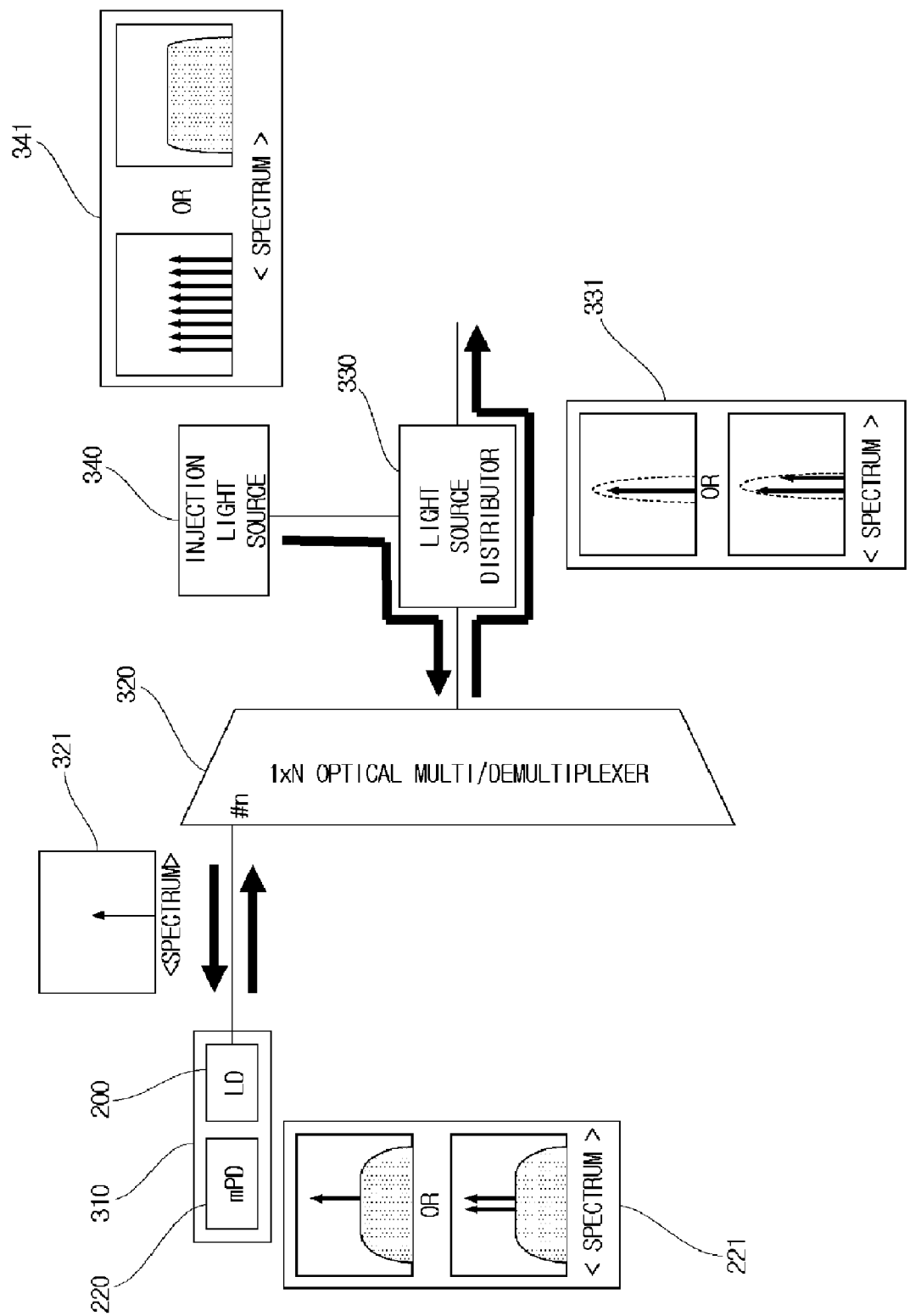

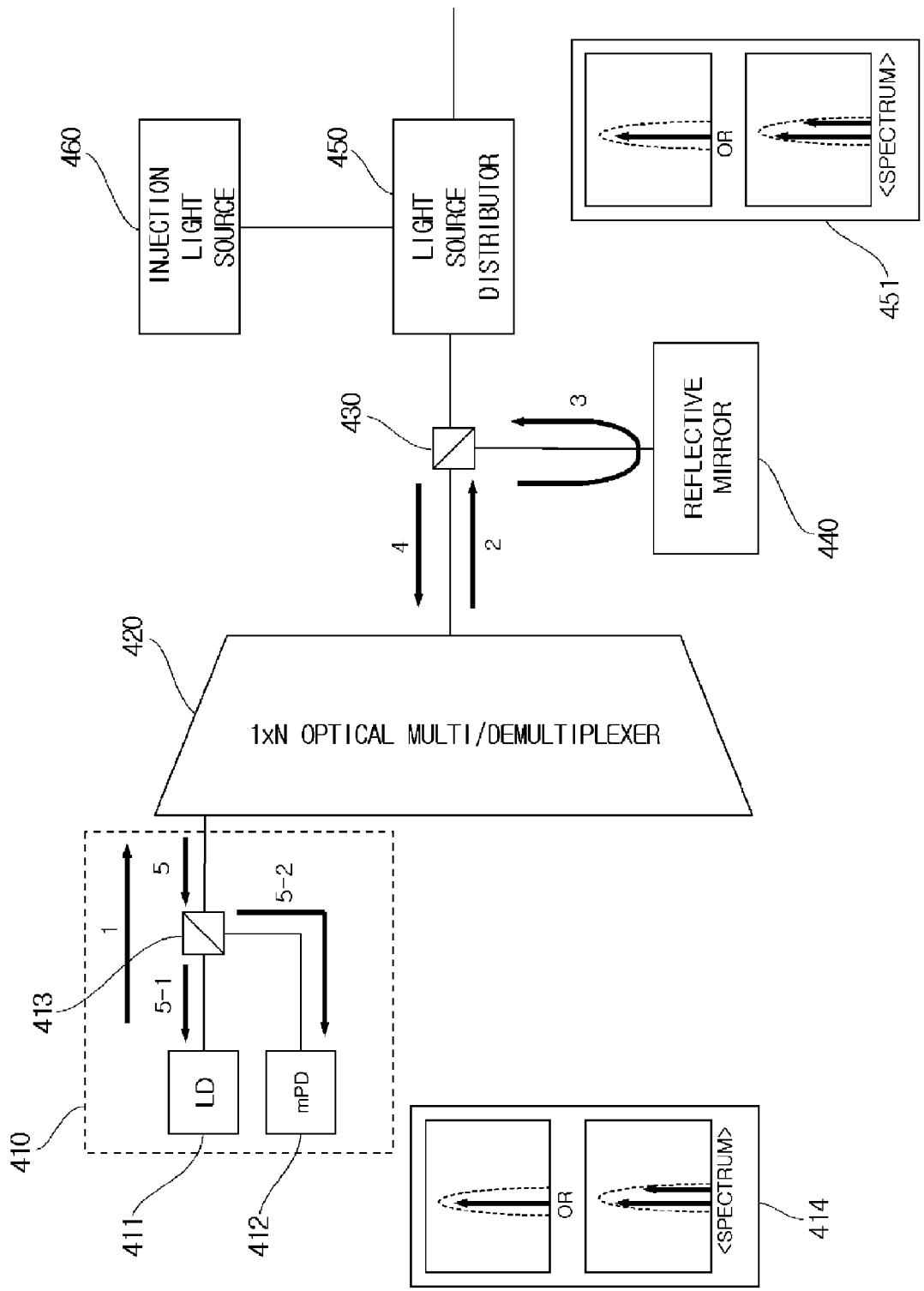
[Fig. 5]

[Fig. 6]
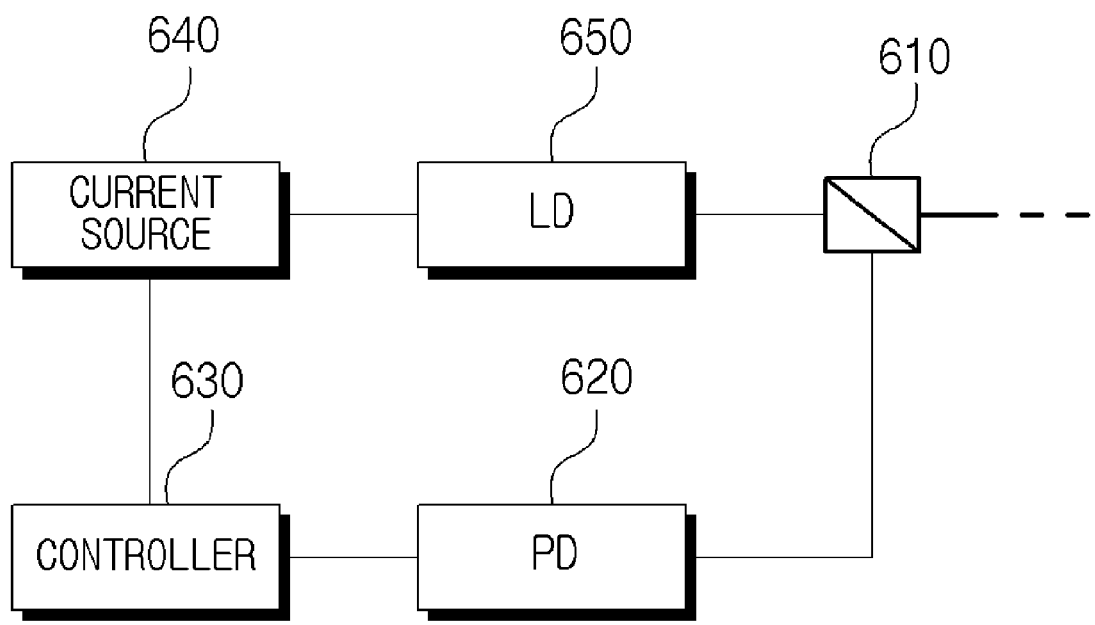

METHOD AND SYSTEM FOR CONTROLLING DRIVING CURRENT OF WDM-PON OPTICAL TRANSMITTER

TECHNICAL FIELD

The present disclosure relates to a WDM-PON (wavelength division multiplexed-passive optical network) optical transmitter; and, more particularly, to a system for controlling a driving current of the WDM-PON optical transmitter.

BACKGROUND ART

A wavelength division multiplexed-passive optical network (WDM-PON) provides a high speed broadband communication service by using an inherent wavelength assigned to each subscriber. Accordingly, each subscriber receives a signal having a different wavelength corresponding thereto, so that a security is enhanced and a separate communication service is provided to each subscriber, thereby enlarging a communication capacity.

Conventionally, a method has been proposed wherein a central office and a subscriber terminal have a respective light source including a distributed feedback-laser diode (DFB-LD) element, thereby realizing the WDM-PON.

However, such method has problems that the DFB-LD element is expensive and a temperature control technique is complicated.

Accordingly, a technique using a wavelength-locked optical signal has been widely used by injecting an incoherent light source into a Fabry-Perot Laser Diode (FP-LD) of a low price, thereby implementing an injection-locked WDM optical signal.

Hereinafter, a configuration of a conventional wavelength division multiplexed-passive optical network 100 will be described in reference to FIG. 1. FIG. 1 shows a schematic block diagram for showing a conventional bidirectional communication in an injection-locked wavelength division multiplexed-passive optical network.

The injection-locked wavelength division multiplexed-passive optical network 100 includes a central office 110, a subscriber terminal 130, a remote node 120 for connecting the central office 110 with each subscriber terminal 130 and an optical cable 140.

The central office 110 has an A band injection light source 111, a B band injection light source 112, a light source distributor 113, a first 1×N optical multiplexer/demultiplexer 114 and a multiplicity of transceivers 115.

The remote node 120 has a second 1×N optical multiplexer/demultiplexer 121 and the subscriber terminal 130 has a plurality of transceivers 131.

The A band injection light source 111 is provided as a light source for an A band optical signal serving as a downstream optical signal. As the A band injection light source 111, an incoherent light source may be mainly used. The A band injection light source 111 generates the A band injection optical signal, and then transmits it to the light source distributor 113.

The B band injection light source 112 is provided as a light source for B band optical signal serving as an upstream optical signal, and, like the A band injection light source 111, an incoherent light source may be mainly used as the B band injection light source 112. The B band injection light source 112 generates the B band injection optical signal, and then transmits it to the light source distributor 113.

The light source distributor 113 receives the A band injection optical signal from the A band injection light source 111 and transmits it to the first 1×N optical multiplexer/demultiplexer 114 of the central office 110. Further, the light source distributor 113 receives a wavelength-locked A band optical signal from the first 1×N optical multiplexer/demultiplexer 114 of the central office 110 and transmits it to the optical cable 140 connected to the remote node 120.

In addition, the light source distributor 113 receives the B band injection optical signal from the B band injection light source 112 and transmits it to the second 1×N optical multiplexer/demultiplexer 121 of the remote node 120 through the optical cable 140. Further, the light source distributor 113 receives a wavelength-locked B band optical signal from the second 1×N optical multiplexer/demultiplexer 121 of the remote node 120 and transmits it to the first 1×N optical multiplexer/demultiplexer 114 of the central office 110.

The first 1×N optical multiplexer/demultiplexer 114 separates the A band optical signal received from the light source distributor 113 according to the wavelength thereof, and then, injects it to each transmitter of the transceivers 115 of the central office 110. For example, as the first 1×N optical multiplexer/demultiplexer 114, an arrayed waveguide grating (AWG) may be used.

As the transmitter of the transceivers 115, the Fabry-Perot Laser Diode (FP-LD) may be used and the transmitter generates the downstream optical signal to be transmitted to each subscriber.

Specifically, if the A band injection optical signal separated based on the wavelength thereof is injected to each transmitter of the transceivers 115, wavelength elements having a wavelength different from that of the injected optical signal are suppressed and wavelength elements having a wavelength equal to that of the injected optical signal is locked, thereby outputting the wavelength-locked A band downstream optical signal.

Each receiver of the transceivers 115 receives a wavelength-locked B band upstream optical signal from the subscriber terminal 130, and then, converts it into an electrical signal. A photo diode (PD) may be used as the receiver of the transceivers 115.

The second 1×N optical multiplexer/demultiplexer 121 of the remote node 120 separates the B band optical signal received from the light source distributor 113 based on the wavelength thereof, and then, injects it to the transceivers 131 of the subscriber terminal 130. The arrayed waveguide grating (AWG) may be used as the second 1×N optical multiplexer/demultiplexer 121 like the first 1×N optical multiplexer/demultiplexer 114.

The Fabry-Perot Laser Diode (FP-LD) may be used as the transmitter of the transceivers 131, for example, and the transmitter generates an upstream optical signal to be transmitted to the central office 110.

Specifically, if the B band injection optical signal separated according to the wavelength thereof is injected to the transmitter of the transceivers 131, wavelength elements having a wavelength different from that of the injected optical signal are suppressed and wavelength elements having a wavelength equal to that of the injected optical signal is locked, thereby outputting the wavelength-locked B band upstream optical signal.

Each receiver of the transceivers 131 receives the wavelength-locked A band downstream optical signal from the central office 110, and then, converts it into an electrical signal. A photo diode (PD) may be used as the receiver of the transceivers 131.

As described above, the transmitter for use in the wavelength division multiplexed-passive optical network (WDM-PON) outputs an optical signal including data.

FIG. 2 depicts characteristics of a laser diode LD used in an optical transmitter.

The laser diode LD 200 generates an optical signal having an optical power P 202 according to a current I 201 applied from a driving circuit (not shown). The laser diode LD 200 is, for example, a diode that generates an optical signal by using a forward semiconductor junction as an active medium, and a material thereof may be GaAs or the like.

The optical power P 202 of the optical signal generated by the laser diode LD 200 has a relationship shown as a graph 200a in FIG. 2 with respect to the current I 201 applied to the laser diode LD 200. That is, the optical power P 202 has a value of 0 in a case that the current I 201 is under the value of a threshold current. However, when the current I 201 exceeds the value of the threshold current, the optical power P 202 increases in proportion to the current I 201.

The laser diode LD 200 receives a driving current 206 and generates an optical signal having an output optical power 207 according to the relationship between the current I 201 and the optical power P 202 shown in the graph 200a.

Therefore, when the temperature is T1, the laser diode LD 200 generates an optical signal having an output optical power of P0 if it receives a current I0, and generates an optical signal having an output optical power of P1 if it receives a current I1.

In other words, when the temperature is T1, a bias current I_bias1 204 of the laser diode is I0, and a modulation current I_mod1 205 thereof is I1-I0.

However, the laser diode LD 200 generates optical signals having different optical powers with respect to an identical driving current depending on the surrounding environment, such as the variation of the temperature or the deterioration of the laser diode LD.

For example, when the temperature is T1 as described above, the laser diode LD 200 generates optical signals having the optical powers P0 and P1 in case of receiving I0 and I1, respectively. However, when the temperature is T2, I2 and I3 need to be applied to the laser LD 200 instead of I0 and I1 as a driving current so as to generate optical signals having the output optical powers P0 and P1, respectively.

That is, when the temperature is T2, a bias current I_bias2 208 and the modulation current I_mod2 209 of the laser diode LD 200 are I2 and I3-I2, respectively.

Thus, the laser diode LD 200 should be applied with driving currents having different values depending on the surrounding environment such as temperature in order to generate identical output optical powers.

Accordingly, an optical transmitter that detects an optical signal outputted from the back facet of the laser diode and calculates the value of the driving current to be applied thereto according to the detected optical signal has been conventionally used. FIG. 3 shows a configuration of a conventional optical transmitter, a relationship between a driving current and an optical power and a relationship between the driving current and a monitoring current.

The conventional optical transmitter that controls the driving current includes a laser diode LD 200, a photo diode PD 220 and a driving circuit 230.

The back facet of the laser diode LD 200 is coated with a material that has a high reflectivity. Thus, most of the optical signal generated by the laser diode LD 200 is outputted through a front facet thereof, while a very small amount of the optical signal is outputted to the back facet thereof. At this time, the optical power of the optical signal outputted from the back facet of the laser diode LD 200 is proportional to that outputted from the front facet thereof.

The photo diode PD 220 receives the optical signal outputted from the back facet of the laser diode LD 200 and then converts the received optical signal into a monitoring current Im 203. The converted monitoring current Im 203 is proportional to the optical power of the optical signal received by the photo diode PD 220, and the photo diode PD 220 transmits the monitoring current Im to the driving circuit 230.

The driving circuit 230 receives the monitoring current Im 203 from the photo diode PD 230, and calculates the optical power of the optical signal outputted from the front facet of the laser diode LD 200 based on the received monitoring current Im 203. Then, the driving circuit 230 controls the value of the driving current I 201 that needs to be applied to the laser diode LD 200 based on the calculated optical power. The laser diode LD 200 generates an optical signal according to the controlled driving current I 201.

The relationship between the driving current I 201 and the optical power P 202 is shown in the graph 200a, and the relationship between the driving current I 201 and the monitoring current Im 203 is shown in the graph 220a. As shown in the graphs 200a and 220a, the optical power of the optical signal actually outputted from the front facet of the laser diode LD 200 is in proportion with the monitoring current Im 203 outputted from the photo diode PD 220.

In the meantime, it is required that an average power and an extinction ratio ER(=P1/P0) of an optical signal received by an optical receiver are controlled to fall within a predetermined range in order to accomplish an optimal performance in the wavelength division multiplexed-passive optical network (WDM-PON) as well as in a general optical transmission system. Accordingly, the driving circuit 230 performs automatic power control (APC) and automatic ER control (AEC) based on the monitoring current Im, so that a bias current and a modulation current are adjusted until the average power and the extinction ratio ER fall within a desired range.

FIG. 4 depicts a WDM-PON implemented by using a conventional optical transmitter in which the driving current is controlled according to the prior art.

The optical transmitter 310 includes a laser diode 200 and a monitoring photo diode mPD 220. The optical transmitter 310 receives an injection light from a 1×N optical multiplexer/demultiplexer 320, generates a wavelength-locked optical signal by using the received injection light, and transmits it back to the 1×N optical multiplexer/demultiplexer 320.

The laser diode LD 200 generates an optical signal according to a driving current applied by a driving circuit (not shown) to transmit most of the optical signal to the 1×N optical multiplexer/demultiplexer 320 through the front facet thereof and a very small amount of the optical signal to the monitoring photo diode mPD 220 through the back facet thereof.

The monitoring photo diode mPD 220 receives the optical signal outputted from the back facet of the laser diode LD 200; converts the optical signal into the monitoring current Im; and then transmits the monitoring current Im to the driving circuit (not shown). The driving circuit calculates the value of the driving current that needs to be applied to the laser diode LD 200 based on the monitoring current Im.

The 1×N optical multiplexer/demultiplexer 320 divides the injection light received from a light source distributor 330 according to the wavelength thereof and then injects the divided injection light to the optical transmitter 310. Moreover, the 1×N optical multiplexer/demultiplexer 320 performs band-pass filtering on each of the wavelength-divided optical signals received from the transmitter 310 to transmit it to the light source distributor 330.

Thus, the driving current to be applied to the laser diode LD 200 has been controlled based on the optical signal outputted from the back facet of the laser diode LD 200 in accordance with the conventional WDM-PON system.

However, the optical signal received by the monitoring photo diode mPD 220 has wavelength bands corresponding to each subscriber and the residual wavelength bands not corresponding to each subscriber. In contrast to this, the optical signal that is received by the optical receiver located in the subscribers side only has the wavelength bands corresponding to each subscriber as depicted in a spectrum 331 since the optical signal is filtered according to the wavelengths thereof by the 1×N optical multiplexer/demultiplexer 320.

Therefore, in accordance with the conventional driving current control system, there have been difficulties in performing precise control of the driving current since the spectrum 331 of the optical signal received by the receiver (not shown) in the subscribers side is not identical to a spectrum 221 of the optical signal serving as a basis for the control of the driving current. Moreover, this discrepancy between the spectrums 221 and 331 occurs very differently depending on the temperature, the intensity of the injection light source and the characteristics of the laser diode LD. Thus, this causes a deterioration of a system performance in the WDM-PON since the implementation of the APC function and the AEC function available in the other optical transmission system cannot be completely achieved.

DISCLOSURE OF INVENTION

Technical Problem

To solve the above-mentioned problems, the present disclosure provides a driving current control system for use in a WDM-PON, capable of controlling a driving current of an optical transmitter based on an optical signal outputted from a common port of an optical multiplexer/demultiplexer.

Technical Solution

In accordance with one aspect of the present invention, there is provided a driving current control system for use in a WDM-PON (wavelength division multiplexed-passive optical network), including: a plurality of optical transmitters, each generating and transmitting a transmittance optical signal based on a driving current; and an optical multiplexer/demultiplexer for combining the optical signals received from the plurality of the optical transmitters to output a combined optical signal through a single common terminal, wherein the driving current is controlled based on the combined optical signal outputted from the common terminal.

In the first aspect of the present invention, the driving current control system may further include a first power splitter for receiving the optical signal from the common terminal and dividing the received optical signal according to a predetermined ratio; and a reflective mirror for reflecting the optical signal divided by the first power splitter and transmitting the reflected optical signal back to the first power splitter, wherein the driving current is controlled based on the optical signal reflected by the reflective mirror.

In accordance with another aspect of the present invention, there is provided a driving current control method of an optical transmitter for use in a WDM-PON, including: generating an optical signal based on a driving current; performing a band-pass filtering on the generated optical signal according to a wavelength corresponding to each subscriber unit; and controlling the driving current based on the band-pass filtered optical signal.

BRIEF DESCRIPTION OF THE DRAWINGS

The disclosure may be best understood by reference to the following description taken in conjunction with the following figures:

FIG. 1 is a diagram for explaining a bidirectional communication in a WDM-PON in accordance with the prior art;

FIG. 2 depicts characteristics of a laser diode LD used in an optical transmitter;

FIG. 3 shows a configuration of a conventional optical transmitter, a relationship between a driving current and an optical power and a relationship between the driving current and a monitoring current;

FIG. 4 depicts a WDM-PON implemented by using a conventional optical transmitter in which the driving current is controlled according to the prior art;

FIG. 5 illustrates a system that controls a driving current of an optical transmitter in a WDM-PON in accordance with an embodiment of the present invention; and FIG. 6 depicts a detailed configuration of the optical transmitter in accordance with the embodiment of the present invention.

MODE FOR THE INVENTION

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

FIG. 5 illustrates a system that controls a driving current of an optical transmitter in a WDM-PON in accordance with an embodiment of the present invention. FIG. 5 depicts only components for transmitting an optical signal for the convenience of explanation The driving current control system of the optical transmitter in accordance with the embodiment of the present invention includes an optical transmitter 410, a 1×N optical multiplexer/demultiplexer 420, a first power splitter 430, a reflective mirror 440, a light source distributor 450 and an injection light source 460.

The optical transmitter 410 includes a laser diode LD 411, a monitoring photo diode mPD 412 and a second power splitter 413. The optical transmitter 410 generates a transmittance optical signal to transmit the optical signal to the 1×N optical multiplexer/demultiplexer 420. The optical signal generated by the optical transmitter 410 is a wavelength-locked optical signal.

Hereinafter, individual constituent component of the transmitter 410 will be explained.

The laser diode LD 411 receives an injection light from the injection light source 460; generates a wavelength-locked optical signal 1 according to a driving current; and then transmits the wavelength-locked optical signal 1 to the 1×N optical multiplexer/demultiplexer 420.

The 1×N optical multiplexer/demultiplexer 420 receives the optical signal 1 from the laser diode LD 411. The optical signal 1 received from the laser diode LD 411 by the 1×N optical multiplexer/demultiplexer 420 is the injection-locked optical signal. The 1×N optical multiplexer/demultiplexer 420 performs a band-pass filtering on the optical signal 1 according to each wavelength to transmit the filtered optical signal 2 to the first power splitter 430 through a common terminal.

The optical signal 2 thus outputted from the common terminal of the 1×N optical multiplexer/demultiplexer 420 only has wavelength bands corresponding to each subscriber as shown in a spectrum 451 since the optical signal 2 is filtered by employing a band-pass filtering according to each wavelength by the 1×N optical multiplexer/demultiplexer 420.

The 1×N optical multiplexer/demultiplexer 420 includes a plurality of individual terminals, each of which is connected with N units of the optical transmitters 410, and a common terminal connected with the first power splitter 430.

Thus, 1×N optical multiplexer/demultiplexer 420 combines optical signals 1 received from N units of the optical transmitters 410 through each terminal thereof, and transmits the combined signal 2 to the first power splitter 430 through the common terminal located in opposite side. The first power splitter 430 receives the optical signal 2 from the common terminal of the 1×N optical multiplexer/demultiplexer 420 to transmit a portion of the received optical signal 3 to the reflective mirror 440 and the rest portion of the received optical signal to the light source distributor 450.

The reflective minor 440 reflects the optical signal 3 transmitted from the first power splitter 430. The optical signal 3 reflected by the reflective minor 440 is transmitted back to the optical transmitter 410 via the first power splitter 430 and the 1×N optical multiplexer/demultiplexer 420.

The second power splitter 413 receives the optical signal from the individual terminal of the 1×N optical multiplexer/demultiplexer 420 to transmit a portion of the optical signal 5-1 to the laser diode LD 411 and the rest portion of the optical signal 5-2 to the monitoring photo diode mPD 412.

The monitoring photo diode mPD 412 receives the optical signal 5-2 from the second power splitter 413 and converts the optical signal 5-2 to a monitoring current Im to transmit the monitoring current Im to the driving circuit (not shown). The driving circuit calculates a driving current to be applied to the laser diode LD 412 based on the monitoring current Im.

A spectrum 414 of the optical signal 5-2 received by the monitoring photo diode mPD 412 is similar to a spectrum 451 of the optical signal 2 outputted from the common terminal of the 1×N optical multiplexer/demultiplexer 420.

Hereinafter, a method for controlling the driving current based on the optical signal generated and transmitted by the laser diode LD 411 is summarized as follows:

(1) The transmittance optical signal 1 generated by the laser diode LD 411 is transmitted to the 1×N optical multiplexer/demultiplexer 420.

(2) The optical signal 1 transmitted to the 1×N optical multiplexer/demultiplexer 420 is transmitted to the first power splitter 430 after the band-pass filtering is performed on the optical signal 1 according to each wavelength.

(3) The optical signal 2 transmitted to the first power splitter 430 is divided, and then a portion of the optical signal 3 is transmitted to the reflective mirror 440.

(4) The optical signal 3 transmitted to the reflective minor 440 is reflected by the reflective mirror 440.

(5) The optical signal 3 reflected by the reflective minor 440 is transmitted back to the 1×N optical multiplexer/demultiplexer 420 via the first power splitter 430.

(6) The optical signal 4 transmitted to the 1×N optical multiplexer/demultiplexer 420 is transmitted to the second power splitter 413 after the band-pass filtering is performed on the optical signal 4 according to each wavelength.

(7) The optical signal 5 transmitted to the second power splitter 413 is divided, and then a portion of the optical signal 5-2 is transmitted to the monitoring photo diode mPD 412. The optical signal 5-2 transmitted to the monitoring photo diode mPD 412 is used as the basis for controlling the driving current of the laser diode 411.

As described above, the driving current control system in accordance with the embodiment of the present invention controls the driving current of the optical transmitter based on the optical signal filtered by the 1×N optical multiplexer/demultiplexer 420 according to corresponding wavelength. The optical signal thus filtered according to each wavelength has a similar spectrum to that of the optical signal received by a receiver (not shown). Therefore, the driving current control system in accordance with the embodiment of the present invention may control the driving current of the optical transmitter based on the spectrum which is similar to that of the optical signal actually received by each subscriber.

FIG. 6 depicts a detailed configuration of the optical transmitter in accordance with the embodiment of the present invention.

The optical transmitter in accordance with the embodiment of the present invention includes a power splitter 610, a photo diode PD 620, a controller 630, a current source 640 and a laser diode LD 650.

The power splitter 610 receives an optical signal from a 1×N optical multiplexer/demultiplexer (not shown). The optical signal received by the power splitter 610 is a portion of a returned optical signal, which is generated by the laser diode LD 650 and transmitted to the 1×N optical multiplexer/demultiplexer and reflected by a reflective mirror.

The power splitter 610 divides the received optical signal to transmit a portion of the optical signal to the laser diode LD 650 and the rest portion of the optical signal to the photo diode PD 620.

The photo diode PD 620 receives the optical signal from the power splitter 610 and converts the received optical signal into an electrical signal. The photo diode PD 620 transmits the converted electrical signal to the controller 630.

The controller 630 receives the electrical signal from the photo diode PD 620, and controls the current source 640 based on the electrical signal. The controller 630 performs an APC function and an AEC function by adjusting the driving current, i.e., the bias current and the modulation current, until the average power and the extinction ratio ER of the optical signal fall within a desired range.

The current source 640 applies the driving current controlled by the controller 630 to the laser diode LD 650. The value of the driving current supplied by the current source 640 is determined based on the optical signal received by photo diode PD 620 as described above.

The laser diode LD 650 generates the transmittance optical signal according to the applied driving current, and transmits the generated optical signal to the 1×N optical multiplexer/demultiplexer (not shown) via the power splitter 610. The optical power of the optical signal generated by the laser diode LD 650 is proportional to the value of the driving current applied to the laser diode LD 650 by the current source 640.

As described above, the controller 630 of the optical transmitter in accordance with the embodiment of the present invention can control the driving current to be applied to the laser diode LD 650 based on the optical signal reflected by the reflective minor connected with the common terminal of the 1×N optical multiplexer/demultiplexer (not shown).

Therefore, the driving current control system of the optical transmitter in accordance with the embodiment of the present invention can control the driving current based on the optical signal filtered by the 1×N optical multiplexer/demultiplexer (not shown) and outputted from the common terminal thereof without using the optical signal outputted from the back facet of the laser diode LD 650, which has been used in the prior art.

The above-described embodiments of the present invention are illustrated and explained by considering only components for transmitting the optical signal for the simplicity of explanation. Such configuration for the transmission of the optical signal may be applied to a case that the center station transmits the downstream optical signal to each subscriber, as well as a case that each subscriber transmits the upstream optical signal to the center station.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiment. It shall be understood that all modifications and embodiments conceived from the meaning and scope of the claims and their equivalents are included in the scope of the present invention.

INDUSTRIAL APPLICABILITY

In accordance with the embodiments of the present invention, there is a beneficial effect that accurate data can be transmitted regardless of the variation of the surrounding environment by controlling the driving current of the optical transmitter based on the spectrum of the optical signal, which is similar to the spectrum actually received by the optical transmitter instead of the spectrum of the optical signal outputted from the back facet of the laser diode.

The invention claimed is:

1. A driving current control system for use in a WDM-PON (wavelength division multiplexed-passive optical network), comprising:
   a plurality of optical transmitters, each transmitter generating and transmitting a transmittance optical signal based on a driving current; and
   an optical multiplexer/demultiplexer for combining the optical signals received from the plurality of the optical transmitters to output the combined optical signal through a single common terminal,
   wherein the driving current is controlled based on the combined optical signal outputted from the common terminal.

2. The driving current control system of claim 1, further comprising:
   a first power splitter for receiving the optical signal from the common terminal and dividing the received optical signal according to a predetermined ratio; and
   a reflective minor for reflecting the optical signal divided by the first power splitter and transmitting the reflected optical signal back to the first power splitter,
   wherein the driving current is controlled based on the optical signal reflected by the reflective minor.

3. The driving current control system of claim 2, wherein each of the optical transmitters includes:
   a second power splitter for receiving the optical signal reflected by the reflective mirror and dividing the received optical signal according to a predetermined ratio;
   a monitoring photo diode for receiving the optical signal divided by the second power splitter and converting the received optical signal to an electrical signal;
   a controller for controlling the driving current based on the electrical signal; and
   a laser diode for generating the transmittance optical signal according to the controlled driving current.

4. The driving current control system of claim 3, wherein the controller adjusts the driving current until an average power and an extinction ratio ER of the optical signal outputted from the common terminal are fall within a predetermined range.

5. The driving current control system of claim 2, wherein the optical multiplexer/demultiplexer is an arrayed waveguide grating (AWG).

6. The driving current control system of claim 1, wherein each optical transmitter is an optical transmitter located in a center station.

7. The driving current control system of claim 1, wherein each optical transmitter is an optical transmitter located in a subscriber unit.

8. A driving current control method of an optical transmitter for use in a WDM-PON, comprising:
   generating an optical signal based on a driving current;
   performing a band-pass filtering on the generated optical signal according to a wavelength corresponding to each subscriber unit; and
   controlling the driving current based on the band-pass filtered optical signal.

* * * * *